M. ROSS.
DIRIGIBLE HEADLIGHT CONSTRUCTION FOR AUTOMOBILES.
APPLICATION FILED JAN. 25, 1922.

1,434,503.

Patented Nov. 7, 1922.

Witnesses
Hyman Berman
Lawrence Schlosser

Inventor
Maxwell Ross,
By Clarence Abt Pruter,
Attorney

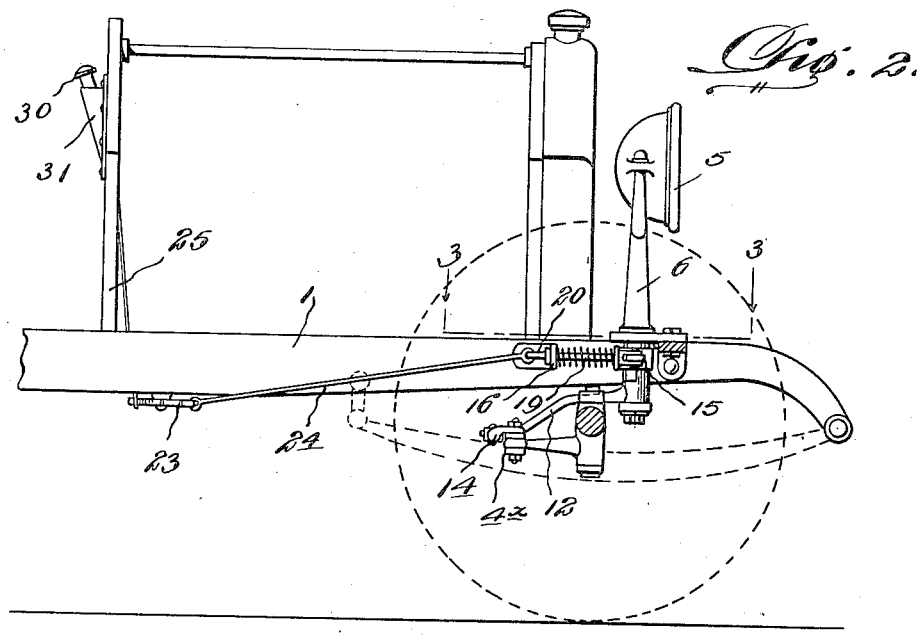
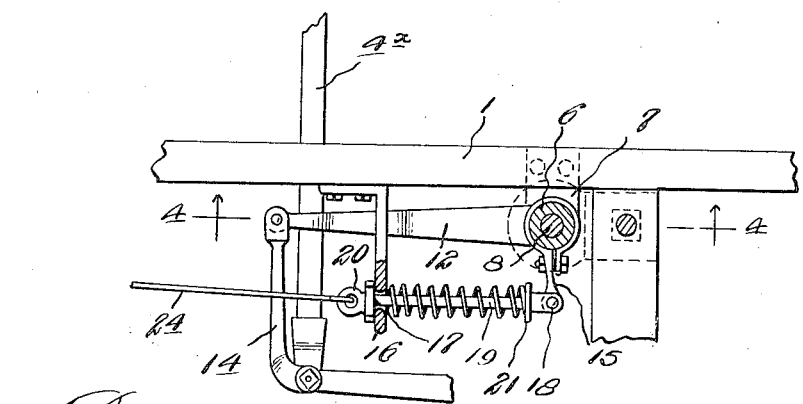

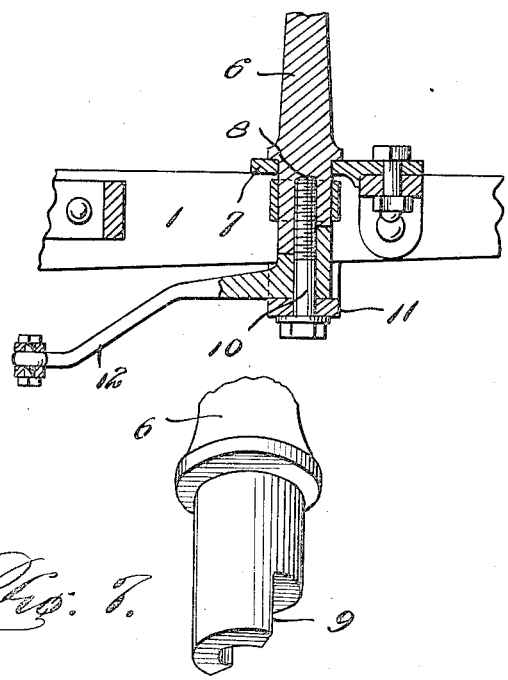
Fig. 4.
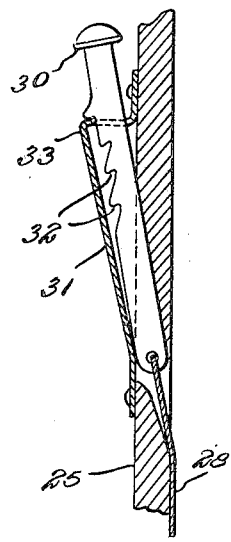
Fig. 6.
Fig. 7.
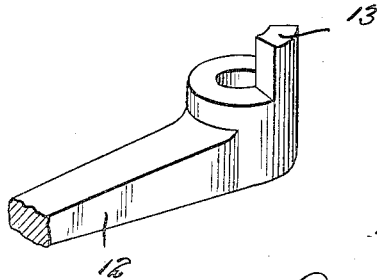
Fig. 8.

Patented Nov. 7, 1922.

1,434,503

UNITED STATES PATENT OFFICE.

MAXWELL ROSS, OF AMARILLO, TEXAS.

DIRIGIBLE HEADLIGHT CONSTRUCTION FOR AUTOMOBILES.

Application filed January 25, 1922. Serial No. 531,733.

*To all whom it may concern:*

Be it known that I, MAXWELL ROSS, a citizen of the United States, residing at Amarillo, in the county of Potter and State of Texas, have invented new and useful Improvements in Dirigible Headlight Constructions for Automobiles, of which the following is a specification.

One object of my said invention is the provision of a dirigible headlight construction of such character that when a car is turned, the headlight toward the turn will alone be turned in the direction of the turn.

Another object of the invention is the provision of a construction of the kind indicated in which either of the headlights may be manually turned at the will of the driver so as to serve as a searchlight for the illumination of the side of a road.

To the attainment of the foregoing, the invention consists in the improvement as hereinafter described and definitely claimed.

In the accompanying drawings, forming part of this specification:—

Figure 2 is a longitudinal vertical section of the same.

Figure 3 is a horizontal section taken in the plane indicated by the line 3—3 of Figure 2.

Figure 4 is a detail vertical section on the line 4—4 of Figure 3.

Figure 6 is a detail vertical section on the line 6—6 of Figure 1.

Figure 7 is an enlarged detail perspective showing the lower portion of one of the lamp posts.

Figure 8 is a detail perspective of one of the swinging arms through which the said posts are turned.

Similar numerals of reference designate corresponding parts in all of the views of the drawings.

Figure 1:
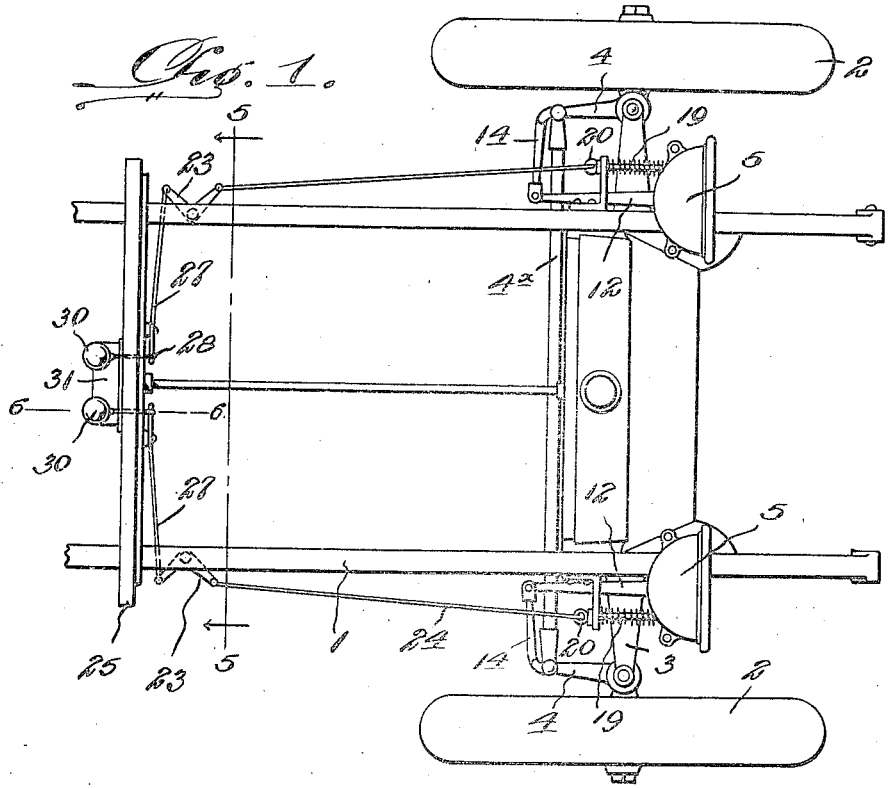
Figure 1 is a plan view showing a portion of an automobile equipped with my improvement.

The automobile chassis 1, the front wheels 2, the front axle 3, and the steering mechanism including swinging knuckles 4 and connecting rod 4ˣ may be of the ordinary well known types or of any other construction compatible with the purpose of my invention.

At 5 are lamps or headlights, and at 6 are posts by which the lamps are carried, the said posts being mounted to turn about their axes in and on brackets 7 carried by the chassis 1, and being provided with threaded bores 8 and side recesses 9, the latter at their lower ends as best shown in Figures 4 and 7.

Headed and threaded bolts 10 are secured in the bores 8 of the posts 6, and supported by washers 11 or the like on the heads of the said bolts 10 are swinging arms 12 through the medium of which the posts 6 are turned about their axis by operation of the steering mechanism. The arms 12 are provided with upwardly extending projections 13, disposed in the recesses 9 of the posts 6 and of less size in horizontal section than said recesses 9. I would also have it here understood that the joint between the post 6 and arm 12 at one side of the car is reversely arranged to the joint between the post 6 and the arm 12 at the opposite side of the car so that when the steering mechanism is actuated to turn the car toward the right the right hand lamp 5 will alone be turned toward the right, the left-hand lamp 5 remaining straight ahead to illuminate in that direction, while when the steering mechanism is actuated to turn the car toward the left, the right hand lamp 5 will remain in straight ahead position and the left hand lamp alone will be turned toward the left. As clearly shown in Figures 1, 2 and 3 the steering mechanism described is connected through links 14 with the arms 12.

Because of the recesses 9 being larger than the projections 13 the posts 6 are capable of turning movement within certain limitations independently of the arms 12.

Clamped on or otherwise appropriately fixed to the lower portions of the posts 6 are arms 15, Figures 2 and 3, and fixed to the chassis 1 and located in rear of the said arms 15 are guide brackets 16, apertured at 17. Pivotally connected at 18 to the arms 15 and extending rearwardly through the apertures 17 of the guide brackets 16 are rods 19 with apertured heads 20 in rear of and normally bearing against the brackets 16. Surrounding the rods 19 and interposed between abutments 21 thereon and the brackets 16 are coiled springs 22 which serve to yieldingly maintain the lamps 5 in and return the same to straight ahead positions.

Figure 5:
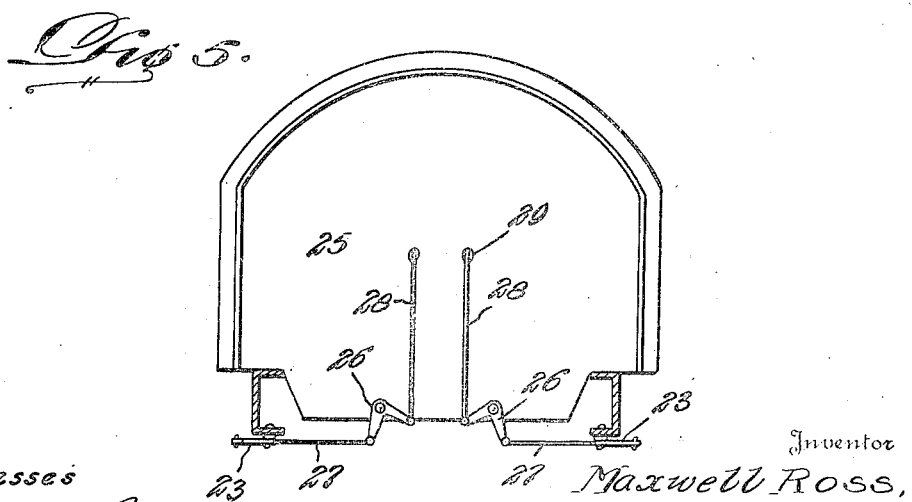
Figure 5 is a detail transverse section on the line 5—5 of Figure 1.

Mounted on the chassis 1 are horizontal bell cranks 23, Figures 1, 2 and 5, the forward arms of which are connected by rods 24 with the rods 19, and mounted on the forward side of the instrument board 25 or other appropriate part of the automobile are vertical bell cranks 26. The outer arms of these cranks 26 are connected through rods 27 with the rear arms of the cranks 23. At 28 are cables connected to the inner arms of the bell cranks 26. The said cables 28 are extended through apertures 29 in the board 25 and are connected to the lower ends of handle bars 30, Figures 1, 2 and 6. These bars 30 are arranged and movable in a housing 31 on the rear side of the board 25, and are toothed at 32 to engage the top wall 33 of the housing 31 so that either of the lamps 5 may be adjustably fixed in the position to which it is moved.

It will be manifest from the foregoing that while driving straight ahead, the driver may when necessary raise the proper handle bar 30 and thereby turn the lamp 5 connected therewith toward the side of the road to illuminate said side, the right hand bar 30 being raised to turn the right hand lamp 5 toward the right hand side of the road, and the left hand bar 30 being raised to turn the lamp 5 toward the left hand side of the road. It will also be noted that after the manual turning of either lamp as described, the said lamp may be adjustably fixed in the turned position by placing its handle bar 30 in engagement with the top wall 33 of the housing 31.

When the two bars 30 are in their lowermost positions, the right hand lamp 5 will be swung toward the right coincident with a turn of the automobile toward the right, and the left hand lamp 5 will be turned toward the left when the automobile is turned toward the left.

It will also be understood from the foregoing that my improvement is susceptible of being applied to and used on cars such as at present in operation as well as to new cars.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. In an automobile, the combination of a chassis, a horizontal, vertically apertured bracket carried thereby, a post journaled in said bracket and having a portion bearing thereon and also having a central threaded socket and a recess in its lower end, a lamp on said post, a threaded bolt occupying the threaded socket in the post and having a head at its lower end, a swinging arm supported on said bolt and having a projection of less size than said post recess extending upwardly into and movable in said recess, steering mechanism, a link connecting said mechanism and said swinging arm, an apertured guide bracket carried by the chassis and disposed in rear of the post, an arm secured to the post below the first-named bracket, a rod connected to said arm and extending rearwardly through the guide bracket and having an abutment in front of the same, and a spring coiled about the rod and interposed between said bracket and abutment.

2. In an automobile, the combination of a chassis, a lamp, a post supported by the chassis and carrying said lamp, said post adapted to be turned about its axis and having a lateral arm, a guide bracket on the chassis in rear of the post, a rod connected to the post arm and extending through and rearwardly of the guide bracket and having an abutment in front of the bracket, a spring about said rod and interposed between the guide bracket and the abutment, a horizontal bell crank mounted on the chassis and having one of its arms connected with said rod, an instrument board having an inclined opening therein, a vertical bell-crank mounted on the forward side of said board and connected with the first-named bell crank, a housing connected to the rear side of the instrument board opposite said opening and having an opening in its top wall, a toothed handle bar disposed and movable in the housing and the said opening thereof and also in said opening in the instrument board, and a connection between said bar and the second-named bell crank.

In testimony whereof, I affix my signature.

MAXWELL ROSS.